US009213779B2

(12) United States Patent
Kähäri et al.

(10) Patent No.: US 9,213,779 B2
(45) Date of Patent: Dec. 15, 2015

(54) METHOD FOR LOADING DATA ELEMENT INTO WIRELESS TERMINAL

(75) Inventors: Markus Kähäri, Helsinki (FI); Antti Sorvari, Itäsalmi (FI); Hannu Toivonen, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 2103 days.

(21) Appl. No.: 11/017,492

(22) Filed: Dec. 20, 2004

(65) Prior Publication Data

US 2005/0193089 A1 Sep. 1, 2005

(30) Foreign Application Priority Data

Dec. 29, 2003 (FI) ..................................... 20031910

(51) Int. Cl.
*G06F 15/16* (2006.01)
*G06F 17/30* (2006.01)
*H04L 29/08* (2006.01)

(52) U.S. Cl.
CPC .......... *G06F 17/30902* (2013.01); *H04L 67/34* (2013.01)

(58) Field of Classification Search
USPC ......................................... 709/203, 218, 227
See application file for complete search history.

(56) References Cited

U.S. PATENT DOCUMENTS

| | | | |
|---|---|---|---|
| 6,085,226 A | 7/2000 | Horvitz | 709/203 |
| 6,237,022 B1 | 5/2001 | Bruck et al. | 709/201 |
| 6,760,757 B1 * | 7/2004 | Lundberg et al. | 709/217 |
| 6,785,707 B2 * | 8/2004 | Teeple | 709/203 |
| 2002/0143896 A1 | 10/2002 | Hansmann et al. | 709/218 |
| 2003/0078964 A1 * | 4/2003 | Parrella et al. | 709/203 |
| 2003/0229542 A1 * | 12/2003 | Morrisroe | 705/14 |
| 2004/0049541 A1 * | 3/2004 | Swahn | 709/203 |
| 2005/0144073 A1 * | 6/2005 | Morrisroe et al. | 705/14 |
| 2010/0174602 A1 * | 7/2010 | Zweben et al. | 705/14.41 |

FOREIGN PATENT DOCUMENTS

WO WO 00/55769 9/2000

OTHER PUBLICATIONS

"Web Prefetching in a Mobile Environment", Zhimei Jiang et al., IEEE Personal Communications, Oct. 1998, pp. 25-34.

* cited by examiner

*Primary Examiner* — El Hadji Sall
(74) *Attorney, Agent, or Firm* — Ditthavong & Steiner, P.C.

(57) ABSTRACT

A method, a terminal implementing the method and a software product for loading at least one data element into a wireless terminal including data on the web pages browsed by the user stored in a definition file. The definition file includes at least the address of one web page. The terminal includes a browser functionality that allows the user to browse web pages on his/her terminal. The terminal detects an appropriate data transmission connection that can be established, whereupon the appropriate data transmission connection is established to the web page, from where at least one data element is stored into the memory of the terminal.

25 Claims, 3 Drawing Sheets

METHOD FOR LOADING DATA ELEMENT INTO WIRELESS TERMINAL

CROSS-REFERENCE TO RELATED APPLICATIONS

This patent application claims priority from Finnish Patent Application No. 20031910 filed on Dec. 29, 2003.

BACKGROUND OF THE INVENTION

1. Field of the Invention

The invention relates to browsing web pages on a wireless terminal and more particularly to loading at least one data element from a web page to the wireless terminal.

2. Brief Description of Related Developments

The Internet offers its users diversified and easily accessible information and entertainment that the user may browse in accordance with his/her preferences. Typically, a computer is used for browsing web pages, but browsing that takes place on wireless terminals, such as mobile stations, is becoming more and more popular, since packet-switched mobile networks, such as 2.5 G and 3 G networks, presently prepare the way for fast network connections with short latent periods. In addition, the high-resolution colour displays, the high capacity flash memories and the versatile operating characteristics of the mobile stations allow presenting the web pages on the mobile stations in a more versatile fashion than before.

In accordance with the prior art, digital data included in the web pages is loaded from a server into a memory of the wireless terminal over a data link, typically because the user of the terminal selects the web page in question. Depending on the data link rate and the terminal load, it may, however, be time-consuming to load the data in the web page into the terminal, and therefore opening the web page on the terminal may be very slow. It should also be noted that loading data is generally expensive. Another problem is that several terminals, such as mobile stations, typically encounter problems when feeding long web site addresses, especially owing to the size of the keyboard and the placing of the characters.

In the solutions known from publications U.S. Ser. No. 2002/0 143 896 and WO 00/55 769, data is loaded from the network into the terminal before the user selects the web page to be opened. However, the problem with the solutions presented in these publications is that data is loaded irrespective of the data transmission rate. Consequently, loading is slow when a slow data transmission connection is used for loading data and therefore expensive for the user of the terminal. What is assumed in the solution presented in publication WO 00/55 769 is that a personal profile is created. The profile may comprise for instance the user's name, age, sex and information about hobbies, on the basis of which the selection of data to be loaded into the terminal is selected. However, what becomes a problem in such a case is that the terminal is provided with a lot of data that the user hardly requires. Loading such useless data, however, loads for instance the memory capacity and the bandwidth excessively and therefore most likely makes the loading of the required data into the terminal more difficult.

SUMMARY OF THE INVENTION

A method has now been developed that reduces the drawbacks of the above-mentioned problems. A method, a terminal and a computer software product are presented as different aspects of the invention and are characterized by what is disclosed in the independent claims. The preferred embodiments of the invention are disclosed in the dependent claims.

The invention is based on the idea that a wireless terminal such as a mobile station comprises a browser functionality that enables the user to browse web pages on the terminal. The terminal is provided with a definition file in which data on the network addresses browsed by the user is stored. The definition file thus comprises an address of at least one web page. When an appropriate data transmission connection to be established, such as an IP datacast, a WLAN (Wireless Local Area Network), a Bluetooth or an EDGE (Enhanced Data rates for GSM Evolution) connection, is detected in the terminal, a data link is established from the terminal to at least one web page, from where at least one data element is stored into the memory of the terminal, for instance a cache memory. In this application, an appropriate data transmission connection refers to a data transmission connection, whose suitability is determined on the basis of at least one parameter, such as the connection rate, the price, the connection point selected by the user or the connection type.

In accordance with an embodiment of the invention, a loading value describing the loading probability of the web page is determined for the web page, for instance as a function of the number of web page openings, the time or times of web page openings. The loading value can also be determined as a function of the number of opening times and the time of opening or as a function of one or more other parameters.

In accordance with an embodiment of the invention, a loading threshold value is determined for the terminal that the loading value of the web page at least has to equal in order to be able to load said data element from the web page.

In accordance with another embodiment of the invention, a favourite list of web pages is created in the terminal based on the loading values of the web pages in such a manner that the higher the loading value of the web page, the higher up in the favourite list it is placed.

In accordance with an embodiment of the invention, at least one data element is loaded into the terminal from the first un-loaded web page in the favourite list, if the loading value of the web page exceeds or equals the loading threshold value.

In accordance with another embodiment of the invention, at least one data element is loaded from a second web page linked to the first web page, if the loading value of the first web page exceeds or equals the loading threshold value.

In accordance with a further embodiment of the invention, the loading state of the terminal is stored so as to be able to interrupt the loading and to continue the loading later on without loosing any data owing to the interruption.

In accordance with still another embodiment of the invention, at least one feature of the pre-loaded web page that is visible for the user, such as font or colour of the title field, is shown in a fashion that differs from the un-loaded web pages, so that the user is able to see, which web pages are loaded into the terminal. The links of the loaded web pages can be presented differently also for instance in the second web pages or in the link lists of the mobile stations, such as bookmarks, history lists and adaptive bookmarks, which typically refer to links that are automatically updated on the user's favourite pages.

Significant advantages are achieved with the method according to the invention. An advantage is that the method enables to automatically determine the data elements to be loaded in advance and to automatically detect the appropriate network connection to be established in the terminal, the method thus being very easy to use for the user of the terminal. Another advantage is that the method enables to selectively load new and changed links of the web pages, and therefore the load of the terminal's memory capacity as well as the energy losses are reduced. Time is also saved and the costs therefore remain low. A further advantage is that since only the data elements of the web pages, which are most likely to be browsed, are loaded, the excessive loading of the bandwidth can be reduced, in which case the access interface rate is not unnecessarily reduced. Still a further advantage of the invention is that the data element can be loaded when the loading occurs rapidly and when the terminal is not subjected to any other traffic. Still another advantage is that loading can be carried out using a fixed-fee connection, whereby loading the data into the terminal is advantageous for the user of the terminal. A further advantage is that the presentation of the pre-loaded web pages in the terminal is faster during the opening stage in comparison to the web pages to be loaded.

BRIEF DESCRIPTION OF THE DRAWINGS

In the following, the invention will be explained in greater detail by means of the preferred embodiments with reference to the accompanying drawings, in which.

DETAILED DESCRIPTION OF THE INVENTION

At present the supply of web pages is huge, and web pages are more and more browsed by means of wireless terminals. Typically, the user of a terminal browses only a very tiny part of the available web pages, and often the users repeatedly return to the same web pages.

Figure 1:
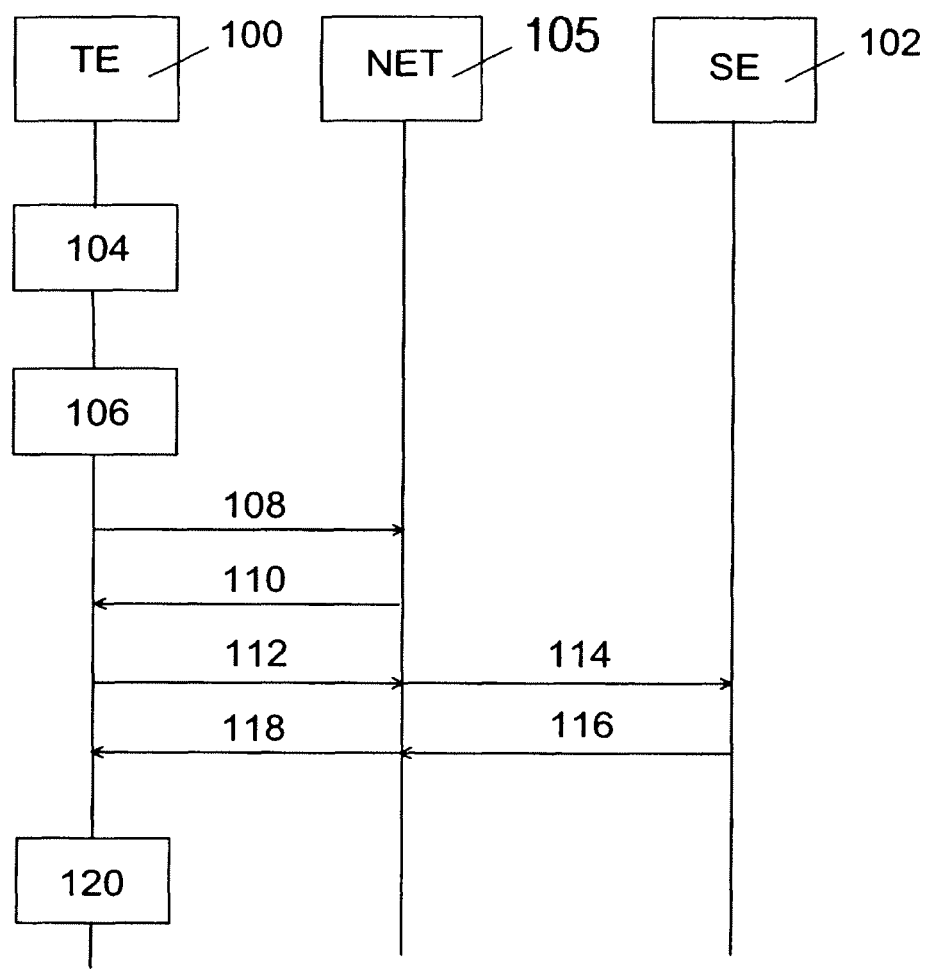
FIG. 1 shows a signal flow diagram according to a preferred embodiment of the invention.

FIG. 1 shows a signal diagram of a method according to a preferred embodiment of the invention for loading at least one data element into a wireless terminal TE (100) including a browsing functionality of web pages from a server SE (102) maintaining the web pages through a network connection. The wireless terminal TE comprises data on the web pages the user of the terminal TE has browsed stored in a definition file (104). Thus, the definition file (104) comprises the address of at least one web page. What is detected (106) in the terminal TE is a data transmission connection to be established, such as an IP datacast, a WLAN, a Bluetooth or an EDGE connection, and consequently a request (108) for establishing a data transmission connection is sent from the terminal TE, whereupon a network server NET (105) sends a confirmation signal (110) to the terminal TE concerning the approximate data transmission connection to be established. The terminal TE sends (112) and the network server NET (105) conveys (114) a loading request of at least one data element to the server SE (102), to which the server SE (102) replies by sending (116) the data element through (118) the network server NET (105) to the terminal TE, in which the data element is loaded (120) into the memory of the terminal.

Communication and data transmission between the terminals TE and the server SE can be carried out using wireless data transmission techniques. Bluetooth refers to a wireless data transmission technique based on a short-range radio connection, the technique being applied for instance to mobile stations and portable computers.

In the following, the invention will be described by way of example on the basis of the Bluetooth technology, but the invention is not restricted merely to this technology. In addition to Bluetooth, the invention can be used in any system that employs for instance short-range radio frequency connections. In addition to Bluetooth, such technologies include HomeRF and WLAN 802.11.

The invention is particularly applicable in mobile stations but not restricted thereto. The mobile stations to be utilized in the invention may be based on any known mobile station technology, as long as they comprise means for establishing a data transmission connection between the terminal TE and the server SE comprising data elements. The data transmission connection may for instance be a GPRS, HSCSD, SMS, USSD or another circuit-switched or packet-switched data transmission connection.

Bluetooth refers to a wireless ad hoc network system. The connection is established using a short-range radio transmitter, the range of which being by default approximately ten meters and using the transmission power of 1 mW, but which may be increased up to hundred meters by increasing the transmission power. In an asynchronous state the data transmission capacity of the Bluetooth system is 723.5 kb/s at the most.

In accordance with a preferred embodiment of the invention, the terminal is a Bluetooth device, which comprises a unique Bluetooth device identifier and which is arranged to actively search for connection points, such as Bluetooth connection points, in the environment thereof. The Bluetooth device may determine the device identifiers of other Bluetooth devices in the vicinity thereof using the Inquiry method described in the standard in such a manner that when the terminal sends a Bluetooth inquiry, all the Bluetooth devices fulfilling the conditions of the inquiry in the vicinity of the terminal reply using their specific Bluetooth device identifiers, if replying has not been restricted. If the terminal is configured to employ a specific Bluetooth connection point, a name inquiry can also be used, to which only the connection point concerned replies. The use of the name inquiry is typically faster and therefore the current consumption is probably reduced. Performing a name inquiry is in view of the current consumption more advantageous, typically also as regards the other devices, since only the device subjected to the name inquiry sends a reply to the name inquiry. The terminals reply to the Bluetooth inquiry also using the device categories thereof, which can be used for instance for searching another Bluetooth connection point, which has not previously been configured to the terminal of the user for pre-loading. Thus, sending Bluetooth inquiries periodically enables the terminal to detect an appropriate Bluetooth device automatically and pre-loading can be started automatically.

When the Bluetooth device has detected a number of identifiers, the Bluetooth device may be connected to another Bluetooth device by means of the Page-method described in the standard. Before connecting to another Bluetooth device said Bluetooth device is in standby mode, and when it is connected the Bluetooth device is in connection mode. When the Bluetooth devices have been connected to one another, they may determine the services supported by one another and the attributes of the services by means of a Service Discovery protocol (SDP). The service attributes refer for instance to the type and category of service and the required mechanism or protocol, by which the service can be employed.

In accordance with an embodiment of the invention, the terminal is arranged to determine the identifiers of the network connections, on the basis of which the terminal may establish for example a network connection that is free of charge. In addition, the terminal may be arranged to monitor the network connections to be established and depending on the type of connection to carry out storing, for instance incrementally, when the use of the network connection encounters a pause.

The Bluetooth network operates at a free 2.4 GHz ISM band (Industrial-Medical-Scientific band). In Europe, the width of an ISM band is 83.5 MHz and the location thereof ranges from 2400 MHz to 2483.5 MHz. Interleaved frequency variation technique based on spread spectrum technique referred to as frequency hopping is used in Bluetooth transmission. The transmission band is typically divided into 79 low bands, and the distance between them is typically approximately 1 MHz. During the radio connection, each low band will only be used for a short period of time, wherefore the frequency of the carrier varies rapidly. Since the signals are spread across a broad frequency range, the effect of interference occurring on individual narrow low bands is reduced.

What interleaving refers to in this context is that the packets to be transmitted include a portion of the previous packet and a portion of the following packet. The protocol Bluetooth employs is a form of data transmission based on a combination of circuit-switched and packet-switched frequency hopping. In packet-switched data transmission the channel is a time division duplex (TDD), whereby the length of one time slot is 625 µs according to the Bluetooth standard. During one time slot one data packet is transferred. After this, the process changes to another low band and another packet is sent. Since the length of a time slot is 625 µs, the frequency changes 1600 times per second. However, the synchronous data is provided with a standard number of time slots for each time unit, in which case the connection functions like circuit-switched data transmission.

Each message generally starts with a 72-bit access code (AC), which is obtained from the master's device identifier. The receiver of a pico network compares an arriving signal with the access code, and if they are not alike, the received packet is rejected. In addition to identifying a packet, the access code is also used for synchronisation and for compensating offset voltage. What generally follows the access code is a 54-bit header (H), which includes everything that is required for identifying the recipient of the message and the type of message (for instance synchronous/asynchronous). The header also includes information associated with flow control, acknowledgement and serial number. A payload that comprises the actual message typically follows the header. The payload may generally vary in different messages from an empty message up to 2745 bits.

The pico network refers to a network complex formed of two or more Bluetooth devices within the range of the Bluetooth radio transmitter. All Bluetooth devices within the network are equal, but the device that is the first one to send data in the network obtains the role of a master, and the other devices in the network operate as slaves in the network. Such a system is referred to as master-slave architecture. The master and the slave may, however, exchange roles, but only one device can be the master at a time. The clock frequencies of the slaves are synchronized with the clock frequency of the master device. Since the master controls the slaves, less interference occurs between the devices.

In accordance with a preferred embodiment of the invention, loading that takes place through a Bluetooth connection is carried out by means of a fixed data transmission connection, which is established for instance between a desktop computer and a browser comprising loadable data elements. Thus, the user has been able to configure the terminal to detect the Bluetooth connection of the desktop computer. After the establishment of an appropriate connection, data is loaded through the desktop computer to the terminal.

Figure 2:
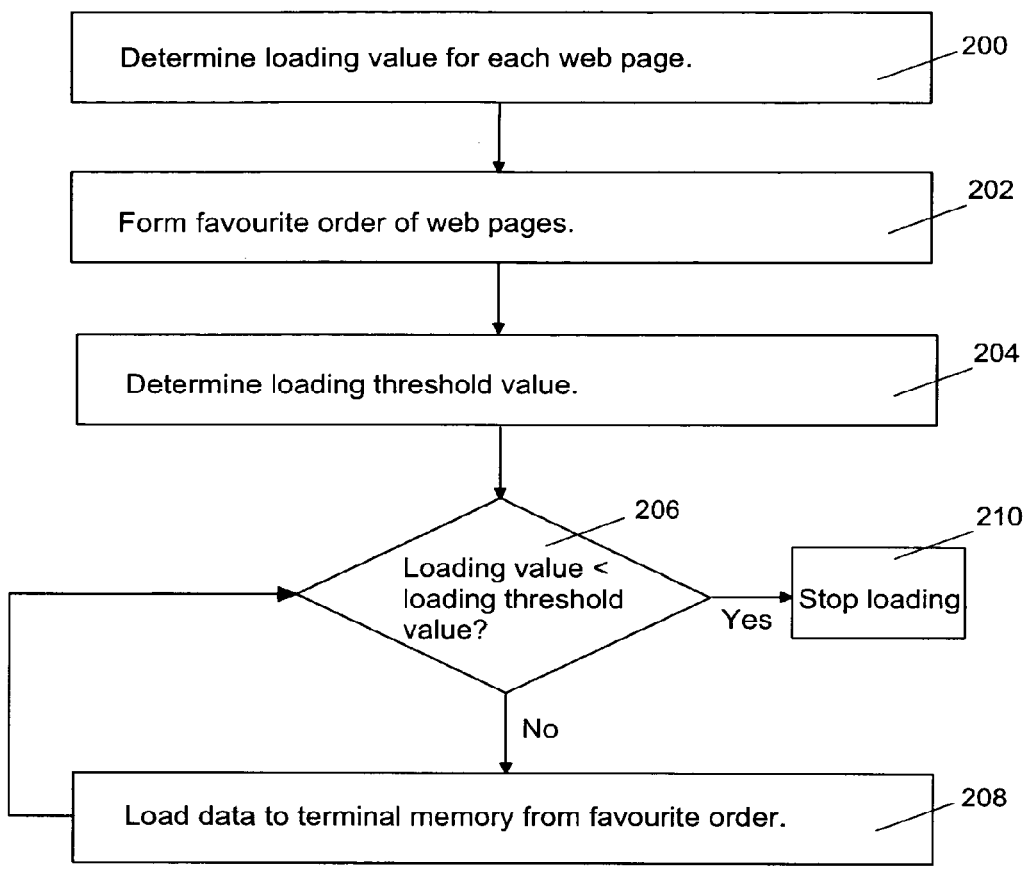
FIG. 2 shows a flow diagram of a preferred embodiment of the invention.

FIG. 2 shows a method according to an embodiment of the invention, in which a loading value (200) of each web page is determined in the terminal TE, for instance as a function of the number of web page openings; in other words the larger the number of openings the higher the loading value of the web page. The loading values allow placing the web pages in a favourite order (202), for instance so that the higher the loading value is the higher up the web page is placed in the favourite list. Alternatively the loading value can be determined as a function of the time instants the web page has been opened, for instance so that the shorter the time elapsed from the previous opening time the greater the loading value of the web page becomes. The favourite order can also be formed by determining the loading value as a function of the number of openings and the time instants of the openings or for instance as a function of the size of the memory capacity available for storing the pages to be loaded, the size of the data elements of the web pages, the predetermined maximum loading times, the charging degree of the terminal battery, the priority order of the pages, the network connection rate, the availability of the meta information on the pages or as a function of the header data. In addition, what are known as the favourite web pages, specifically defined by the user can be placed in the favourite order in a predetermined manner so that the favourite web pages are placed first in the favourite order irrespective of the loading value thereof or so that all the favourite web pages are provided with a predetermined loading value. Thus, the placing of the favourite web pages in the favourite order depends on the loading values of the other web pages.

A loading threshold value is pre-determined (204) for the loading, for instance as a function of the size of the available memory capacity, the charging degree of the terminal battery, the data transmission connection rate or any other parameter. Before loading the information, the loading value is compared (206) with the loading threshold value, and if the loading value exceeds or equals the loading threshold value, information is loaded (208) into the memory of the terminal TE in the favourite order, for instance starting from the first unloaded web page of the favourite order. Loading is continued until the loading value of the web page placed next in the favourite order is smaller than the loading threshold value, in which case the loading is ended (210).

The web pages are typically provided with what are known as static links, in other words links that appear on the web pages for a long time, such as links to different portal sections, like the news, sports, entertainment and money sections, and links from the security listings to individual security pages, in which case the link is static although the contents thereof are dynamic. The web pages are typically also provided with dynamic links, in other words links that appear on the pages only for a short time, such as links to individual news topics, topics for group conversation, television program pages and purchase offers. The division into static and dynamic links is generally based only on a subjective evaluation of the operating life of the link. The web page may comprise for instance only static or dynamic links, but typically both type appear on the pages.

In accordance with a preferred embodiment at least one data element is loaded to the terminal TE from the web pages linked to the web page to be loaded in accordance with the favourite order. What can be loaded from the web pages linked to the web page is for example data elements of all the linked web pages or alternatively the data elements of only those linked web pages that comprise new data elements, which have not yet been loaded to the terminal TE. The user has typically not visited the linked web pages previously, and therefore they are not loaded on the basis of the favourite order. In general, these web pages comprise, however, data that is interesting to the user, and therefore it is possible that the user opens a web page that is behind a link by means of the terminal TE.

According to a preferred embodiment, the loading state of the terminal TE is stored for instance periodically. Then the loading can be continued later on, for instance starting from a stored state without loosing any information owing to the interruption. The interruption may be caused for instance by the use of a data transmission connection to another operation typically provided with a higher priority, such as reading an e-mail during loading.

In accordance with a preferred embodiment, the web pages, from which information has been loaded in advance to the terminal TE, can be illustrated to the user of the terminal TE for example using a different font of the web page link concerned in comparison with the fonts of the other web page links, on the specific web pages, on other web pages, by marking the web page concerned as the favourite web site, in the bookmarks, in the adaptable bookmarks or in the history data of the web page.

Figure 3:
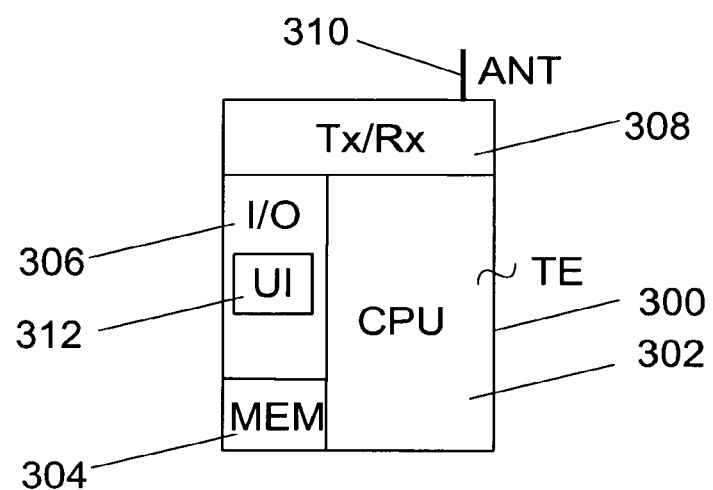
FIG. 3 shows a block diagram of a wireless terminal.

FIG. 3 shows a block diagram of a wireless terminal TE (300), in which the invention can be applied. In this context the wireless terminal TE refers to a device including the means required for implementing a wireless data transmission. Examples of such devices are devices capable of data transmission with a PLMN network, such as the GSM/GPRS network, or devices capable of data transmission with a third generation network, such as the 3 GPP system.

The wireless terminal TE comprises a central processing unit, CPU (302) including one or more processors, a memory MEM (304), an I/O system I/O (306) and a transceiver Tx/Rx (308) arranged to send and receive data transmission according to different wireless data transmission protocols through an antenna ANT (310). The required data is stored into the memory MEM of the terminal TE, the memory typically comprising read-only memory, such as ROM (Read Only Memory) for storing the applications controlling the central processing unit CPU and other data to be stored, as well as write memory, such as RAM (Random Access Memory), and/or FLASH memory to be used for temporarily processing data. Through the I/O system, the terminal TE communicates outwards for instance with other terminals, the network and the user. A user interface UI (312), which is a part of the I/O system, may comprise for instance an interface, such as a display, a keyboard, a loudspeaker and a microphone, through which the terminal and the user may communicate with one another. The data received from different components of the terminal TE are conveyed to the central processing unit CPU that processes the data obtained. In addition, the terminal TE comprises means for detecting an appropriate data transmission connection.

The method according to the invention for loading at least one data element into a wireless terminal can be implemented using a computer software product that is arranged to be executed in the wireless terminal shown in FIG. 3. The computer software product comprises a program code for implementing the browser functionality, a program code for detecting an appropriate data transmission connection to be established to the terminal, a program code for establishing the data transmission connection from the terminal to at least one network page, a program code for receiving the data element from the web page and a program code for storing the data element into the memory of the terminal.

It is apparent for those skilled in the art that as technology progresses the basic idea of the invention can be implemented in various ways. The invention and the embodiments thereof are therefore not restricted to the above examples but may vary within the scope of the claims.

The invention claimed is:

1. A method comprising:
  detecting an appropriate data transmission connection to be established in a first wireless terminal,
  determining a loading value of a web page as a function of the number of opening times and the duration of opening,
  establishing a connection through said data transmission connection to said web page if the loading value is at least equal to a threshold,
  determining a loading threshold value as a function of at least one pre-determined parameter,
  forming the favorite order of the web pages so that the web page provided with a higher loading value is placed before the web page provided with a lower loading value,
  loading at least one data element from said web page into a memory of the terminal, and
  updating the loading value of said web page based on the loaded at least one data element.

2. A method as claimed in claim 1, wherein said appropriate data transmission connection refers to a data transmission connection, the suitability of which is determined on the basis of at least one of the following parameters:
  connection rate
  price
  connection point selected by the user
  connection type.

3. A method as claimed in claim 1, wherein the loading value of the web page should at least equal the loading threshold value in order to be able to load the data element from said web page.

4. A method as claimed in claim 1, further comprising:
  loading at least one data element into the memory of said terminal from the first un-loaded web page of said favorite order in response to the fact that the loading value of said web page exceeds or equals said loading threshold value.

5. A method as claimed in claim 1, further comprising:
  determining a loading value of said web page as a function of one or more time instants of opening of the web pages.

6. A method as claimed in claim 5, further comprising:
  determining a loading threshold value as a function of at least one pre-determined parameter, and the loading value of the web page should at least equal the loading threshold value in order to be able to load the data element from said web page.

7. A method as claimed in claim 6, further comprising:
  forming the favorite order of the web pages so that the web page provided with a higher loading value is placed before the web page provided with a lower loading value.

8. A method as claimed in claim 7, further comprising:
  loading at least one data element into the memory of said terminal from the first un-loaded web page of said favorite order in response to the fact that the loading value of said web page exceeds or equals said loading threshold value.

9. A method as claimed in claim 1, further comprising:
  loading at least one data element from a second web page linked to said web page.

10. A method as claimed in claim 1, further comprising:
  storing the loading state of the terminal in such a manner that the loading can be interrupted and the loading can be continued later on without losing any data.

11. A method as claimed in claim 1, further comprising:
showing at least one data item that can be associated with the unloaded web page in a different manner than the unloaded web pages.

12. A method as claimed in claim 1, wherein the appropriate data transmission connection is one of the following:
an IP datacast
WLAN
Bluetooth
EDGE.

13. A terminal comprising:
a browser functionality and a definition file of the web pages browsed by the user, the definition file comprising an address of at least one web page, wherein:
said terminal is configured to detect an appropriate data transmission connection to be established,
said terminal is configured to determine a loading value of said web page as a function of the number of opening times and the duration of opening,
said terminal is configured to establish said data transmission connection for at least one of said web pages if the loading value is at least equal to a threshold,
said terminal is configured to determine a loading threshold value as a function of at least one pre-determined parameter,
said terminal is configured to form the favorite order of the web pages so that the web page provided with a higher loading value is placed before the web page provided with a lower loading value,
said terminal comprises means for loading at least one data element from said web page into a memory of said terminal, and
said terminal is configured to update the loading value of said web page based on the loaded at least one data element.

14. A terminal as claimed in claim 13, wherein
the loading value of the web page should at least equal the loading threshold value in order to be able to load said data element from said web page.

15. A terminal as claimed in claim 13, wherein
said terminal is configured to load at least one data element into the memory from the first un-loaded web page in said favorite order in response to the fact that the loading value of said web page exceeds or equals said loading threshold value.

16. A terminal as claimed in claim 13, wherein
said terminal is configured to determine a loading value of said web page as a function of the time instant of the web page opening.

17. A terminal as claimed in claim 16, wherein
said terminal is configured to determine a loading threshold value as a function of at least one pre-determined parameter, and the loading value of the web page should at least equal the loading threshold value in order to be able to load said data element from said web page.

18. A terminal as claimed in claim 17, wherein
said terminal is configured to form the favorite order of the web pages so that the web page provided with a higher loading value is placed before the web page provided with a lower loading value.

19. A terminal as claimed in claim 18, wherein
said terminal is configured to load at least one data element into the memory from the first un-loaded web page in said favorite order in response to the fact that the loading value of said web page exceeds or equals said loading threshold value.

20. A terminal as claimed in claim 13, wherein
said terminal is configured to store at least one data element from a second web page linked to said web page.

21. A terminal as claimed in claim 13, wherein
said terminal is configured to store loading state in such a manner that the loading can be interrupted and the loading can be continued later one without losing any data.

22. A terminal as claimed in claim 13, wherein
said terminal is configured to show at least one data item that can be associated with the unloaded web page in a different manner than the preloaded web pages.

23. A computer software product comprising program code stored in memory, the program code being configured to, when executed in a terminal:
implement a browsing functionality,
detect an appropriate data transmission connection to be established to a wireless terminal,
determine a loading value of a web page as a function of the number of opening times and the duration of opening,
establish the data transmission connection from said terminal to at least one web page if the loading value is at least equal to a threshold,
determining a loading threshold value as a function of at least one pre-determined parameter,
forming the favorite order of the web pages so that the web page provided with a higher loading value is placed before the web page provided with a lower loading value,
receive at least one data element from said web page,
store said data element into a memory of said terminal, and
update the loading value of said web page based on the loaded at least one data element.

24. A method as claimed in claim 1, wherein loading of the data elements is continued until the loading value of said web page is smaller than the threshold.

25. A method as claimed in claim 1, wherein at least one visible feature of a loaded web page is differentiated from said at least one visible feature of an un-loaded web page.

* * * * *